United States Patent [19]

Hummel et al.

[11] Patent Number: 4,991,697
[45] Date of Patent: Feb. 12, 1991

[54] DISC BRAKE PAD

[75] Inventors: Alan R. Hummel; Ernest R. Welch, both of Winchester, Va.

[73] Assignee: Abex Corporation, Newton, Mass.

[21] Appl. No.: 468,007

[22] Filed: Jan. 16, 1990

Related U.S. Application Data

[62] Division of Ser. No. 320,945, Mar. 9, 1989, Pat. No. 4,924,583.

[51] Int. Cl.$^5$ .............................................. F16D 69/00
[52] U.S. Cl. ................................. 188/250 B; 188/73.1
[58] Field of Search ............... 188/73.1, 73.37, 250 B, 188/250 E, 251 A

[56] References Cited

U.S. PATENT DOCUMENTS 4,154,322  5/1979  Yamamoto et al. ............. 188/73.37

FOREIGN PATENT DOCUMENTS 0026578  4/1981  European Pat. Off. ........ 188/250 E
2441100  7/1980  France ............................. 188/73.1
0086244  7/1981  Japan .................................. 188/73.1
0093527  4/1987  Japan .................................. 188/73.1

Primary Examiner—Duane A. Reger
Attorney, Agent, or Firm—Thomas S. Baker, Jr.

[57] ABSTRACT

A disc brake pad in which the friction material is attached to the backing plate mechanically bonded with adhesives and through mechanical attachment to an expanded metal mesh utilizing uncompacted friction material and a compacted friction material preform.

1 Claim, 1 Drawing Sheet

DISC BRAKE PAD

This application is a division of patent application Ser. No. 07/320,945 filed Mar. 9, 1989, now U.S. Pat. No. 4,924,583.

BACKGROUND OF THE INVENTION

Disc brakes have been utilized in automotive service braking applications for automobiles and light trucks for many years. Such brakes have gained such wide acceptance in these applications because of superior performance to conventional drum brakes that almost all such vehicles utilize disc brakes for some or all wheels of the vehicle. Disc brakes have gained less acceptance for service braking applications in connection with air actuated brake systems used on heavy trucks, buses and other heavy wheeled vehicles.

That disc brakes have not gained greater acceptance in connection with heavy vehicles resides partially in the fact that during braking applications when the vehicles are heavily loaded large forces must be applied to the brake shoes in order to obtain satisfactory braking service. Because of the large forces involved in braking heavy vehicles, the temperature at the interface of the friction material and the wheel drum or rotor may exceed 1800° F. By design, the friction braking material has a thermal conductivity which allows much of the heat generated at the braking interface to be absorbed into the friction material. This design reduces the peak and operating temperatures at the braking interface and thereby reduces brake fade during heavy, frequent and prolonged braking applications.

Because of the relatively high temperatures developed at the friction material/brake drum interface of heavy vehicle braking systems, the brake pads utilized in disc brake systems under some conditions have been found to separate from a backing plate which conventionally attaches the friction material to a disc brake caliper.

In disc brake pads utilized in early disc brake systems, the friction material was riveted to a backing plate which preferably was steel and the assembly was mounted within a disc brake caliper. One problem associated with employing rivets to fasten the friction material to the backing plate was that by necessity a portion of the rivet had to reside within the friction material, usually a distance of between 0.125 and 0.500 inches, which rendered the portion of the friction material between the outer end of the rivet and the backing plate unusable. Accordingly, later developments led to the use of structural adhesives to bond friction material to backing plates for disc brake applications. The bonded friction material brake pads and shoes had the advantage that none of the friction material above the surface of the backing plate was sacrificed and the structural adhesives which formed the bond, in some applications, had a greater resistance to shear failure of the friction material with respect to the backing plate than rivets.

However, despite the advantages inherent in bonded brake shoes or pads over riveted shoes or pads, the use of bonded disc brake pads in disc brake systems for heavy trucks and other heavy wheeled vehicles has seen the debonding of friction material elements from backing plates under some applications of extreme thermal and mechanical loading. In an effort to prevent detachment of the friction material from the backing plate, various mechanical attachments have been employed including extruding the friction material into holes formed in the backing plate when the friction material preform is being subjected to heat and pressure during the curing operation. Although disc brake pads for use in disc brake systems on heavy vehicles have improved, detachment of the friction material from the backing plate continues to remain a problem in these vehicles where extreme thermal loads and mechanical loads regularly are encountered.

Accordingly, it is desirable to provide a disc brake pad for use in a disc brake system on heavy wheeled vehicles in which the friction material will remain attached securely to the backing plate of a disc brake pad despite the extremely high thermal loads and mechanical loads these systems encounter during severe braking applications.

SUMMARY OF THE INVENTION

The present invention covers a method of forming and attaching a friction member to the metal backing plate of a disc brake pad comprising the steps of cleaning the top surface of the backing plate, welding expanded metal mesh to the top surface, grit blasting the metal mesh and the backing plate, raising the non-welded portion of the expanded metal mesh above the top surface of the back plate, applying adhesive to the expanded metal mesh on the top surface, placing the back plate in a mold, pouring loose friction material weighing less than about fifteen percent of the weight of a compacted friction material preform over the expanded metal mesh and backing plate, placing a compacted friction material preform in the cure mold on top of the expanded metal mesh and applying a combination of heat and pressure to the backing plate, adhesive, loose friction material and the friction material preform in the mold to thereby cause the loose material and the preform to form a unitary friction member rigidly attached to the top surface of the backing plate in which the expanded metal mesh has become embedded therein.

DESCRIPTION OF THE PREFERRED EMBODIMENT

Figure 3:
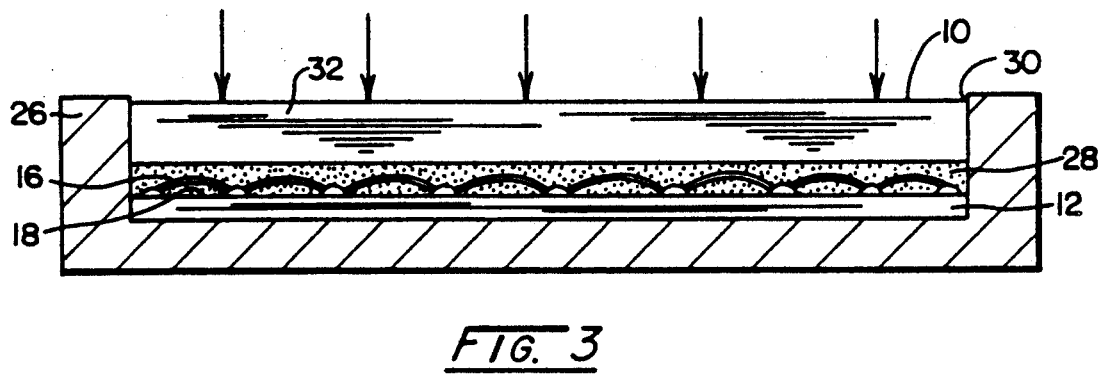
FIG. 3 represents a cross-sectional view of the disc brake pad of the present invention in a cure mold.

The disc brake pad of the present invention is manufactured in a manner which employs a combination of mechanical attachment, structural adhesive bonding, and friction material bonding to cause the friction material to be attached to the backing plate in a manner that will enable it to withstand extremely high thermal loads and mechanical loads encountered in use in heavy vehicles. Turning to FIG. 3, the disc brake pad (10) of the present invention has a backing plate (12) with a plurality of spaced holes (14) formed therein. Although preferably the backing plate is constructed from material such as steel, it may be constructed from any similar material which exhibits the same characteristics of rigidity, strength, dimensional stability and cost effectiveness. A piece of expanded metal mesh (16) overlies the top surface (18) of backing plate (12). The expanded metal mesh (16) has a shape which corresponds generally with that of backing plate (12).

Prior to the attachment of the expanded metal mesh (16) to the backing plate (12) both of these elements are cleaned in a commercial degreasing process to remove any protective coatings and oils. Thereafter, the expanded metal mesh (16) is attached mechanically to backing plate surface (18) by a plurality of welds (20) which may be made by electrical welding equipment. These welds are made at discreet locations on backing plate surface (18) in a specific pattern which ensures that the welds do not overlie backing plate holes (14). There must be a sufficient number of welds to ensure that the metal mesh will remain firmly attached to backing plate (12) when subjected to an expansion process to be described hereinbelow and during severe braking applications of the pad.

Subsequent to attachment of the metal mesh (16) to the backing plate (12), a hardened grit preferably no smaller than number 60 is blasted onto the backing plate/metal mesh assembly to remove all oxidation and contamination from the surfaces of these components. Additionally, the grit blasting operation increases the surface area of the steel back and the metal mesh by increasing the roughness of these surfaces. The increased surface area of these elements increases the surface area to which an adhesive may be applied for added bonding strength.

Figure 1:
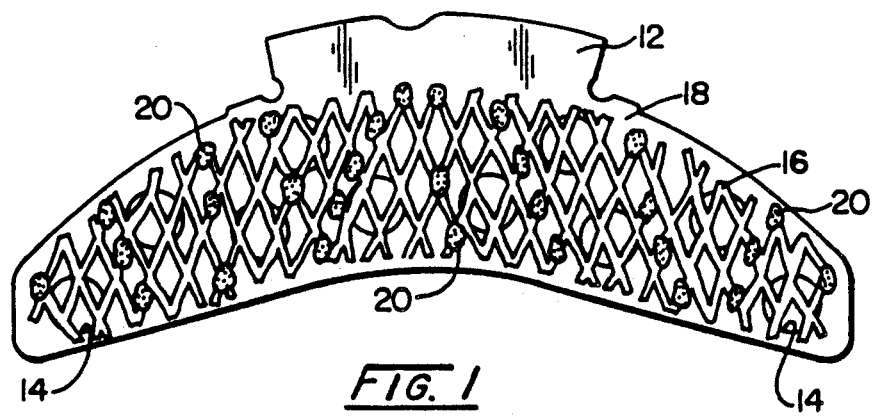
FIG. 1 represents a plan view of a backing plate having expanded metal welded to the top surface thereof.
Figure 2:
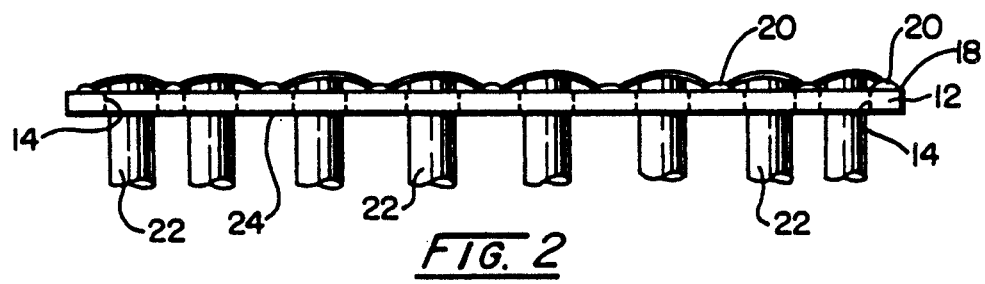
FIG. 2 represents a side view of a backing plate illustrating punches utilized to raise the expanded metal above the top surface of the back plate.

Subsequent to the grit blasting or cleaning operation, the backing plate/metal mesh assembly is inserted into a fixture, not shown, and a series of punches (22) are passed into the backing plate holes (14) beneath the metal mesh (16) and applied to the bottom of the metal mesh to raise the non-welded area of the mesh above the top surface (18) of backing plate (12) as may be seen by referring to FIG. 2. Preferably the non-welded portion of the metal mesh would be raised a distance of between 0.375 and 0.500 inches above the top surface (18). Raising the metal mesh above the surface of the back plate enables adhesive and friction material to mechanically interlock with the metal mesh as will be described hereinbelow.

As an alternative to welding the metal mesh to the backing plate and thereafter raising the non-welded areas of the mesh by punches or plugs passing through holes in the backing plate, the expanded metal mesh may be alternately welded and bent over a rod to raise it above the surface of the backing plate. Subsequent to raising the non-welded area of the expanded metal mesh above the surface of the backing plate, an industrial adhesive is applied to the metal mesh and backing plate surface (18). The adhesive may be applied to the cleaned, roughened backing plate/metal mesh assembly by brushing or spraying. Some adhesives may require drying by subjecting the assembly to an elevated temperature which may be approximately 165° F. for a period of time which may be one-half hour.

After the adhesive has been applied to the assembly, it is placed in a conventional cure mold (26) illustrated in FIG. 3. Subsequent to this insertion loose, uncompacted, friction material (28) having a weight in the range of six to twenty percent of the total weight of the friction material for the part is poured into the mold cavity (30). This material is distributed evenly over the surface of the backing plate/metal mesh assembly. Preferably, most of the uncompacted friction material would reside in the space between the backing plate top surface (18) and the metal mesh (16). This ensures that the friction material will be interlocked with the expanded metal mesh subsequent to the curing operation.

Following the distribution of the uncompacted friction material (28), a conventional compacted preform (32) having metal and non-metal fillers and a phenolic resin binder is placed in the cure mold such that it overlies the uncompacted friction material (28) and the expanded metal mesh (16). Thereafter, a combination of heat and pressure are applied to the disc brake pad (10) within the mold (26) to cure the friction material in a conventional manner. Subsequent to the curing operation, the uncompacted friction material (28) becomes compacted and forms a homogenous, unitary friction element which is mechanically and adhesively connected to the metal mesh (16) and to backing plate top surface (18).

It has been found that the above described process for manufacturing a disc brake pad in which the friction material has been attached to the backing plate mechanically, through structural adhesive bonding and through a mechanical attachment to the expanded metal mesh utilizing uncompacted friction material and a compacted friction material preform provides a disc brake pad in which the friction material has a greatly increased tolerance to separation from the backing plate when subjected to extreme mechanical loads and thermal stresses.

Since certain changes may be made to the above described apparatus, system and method without departing from the scope of the invention herein, it is intended that all matter contained in the description thereof or shown in the accompanying drawings shall be interpreted as illustrative and not in a limiting sense.

We claim:

1. A disc brake pad which comprises:
   a metal backing plate having a top surface adapted to receive a friction member;
   an expanded metal mesh element which is affixed to said top surface by welding at discrete locations and which contacts said top surface at said same discrete locations;
   wherein said metal mesh is expanded away from said top surface such that it projects upwardly above said top surface to enable adhesive and friction material to occupy the spaces created between said metal mesh and said top surface; and
   a friction member comprising a first layer of compacted friction material powder adjacent said top surface and a second layer of a solid friction material preform on top of said compacted powder layer wherein said metal mesh projects into said first layer of compacted friction material.

* * * * *